US012580216B2

(12) United States Patent
Kim et al.

(10) Patent No.: US 12,580,216 B2
(45) Date of Patent: Mar. 17, 2026

(54) APPARATUS FOR MANUFACTURING ELECTRODE ASSEMBLY, ELECTRODE ASSEMBLY MANUFACTURED THERETHROUGH, AND SECONDARY BATTERY

(71) Applicant: LG ENERGY SOLUTION, LTD., Seoul (KR)

(72) Inventors: Woong Ki Kim, Daejeon (KR); Sang Don Lee, Daejeon (KR); Sang Uk Yeo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 611 days.

(21) Appl. No.: 17/783,683

(22) PCT Filed: Dec. 8, 2020

(86) PCT No.: PCT/KR2020/017823
§ 371 (c)(1),
(2) Date: Jun. 9, 2022

(87) PCT Pub. No.: WO2021/118197
PCT Pub. Date: Jun. 17, 2021

(65) Prior Publication Data
US 2023/0105865 A1 Apr. 6, 2023

(30) Foreign Application Priority Data
Dec. 12, 2019 (KR) ........................ 10-2019-0166055

(51) Int. Cl.
*H01M 10/04* (2006.01)
*H01M 50/46* (2021.01)

(52) U.S. Cl.
CPC ....... *H01M 10/0404* (2013.01); *H01M 50/46* (2021.01)

(58) Field of Classification Search
None
See application file for complete search history.

(56) References Cited

U.S. PATENT DOCUMENTS

2005/0061047 A1\* 3/2005 Laliberte .................. B21B 3/00
72/147
2005/0207803 A1 9/2005 Deguchi et al.
(Continued)

FOREIGN PATENT DOCUMENTS

CN 102569732 A 7/2012
CN 105082524 A 11/2015
(Continued)

OTHER PUBLICATIONS

JPH1050300A Machine Translation (Year: 1998).\*
(Continued)

*Primary Examiner* — Victoria H Lynch
(74) *Attorney, Agent, or Firm* — Birch, Stewart, Kolasch & Birch, LLP

(57) ABSTRACT
An apparatus for manufacturing an electrode assembly includes a first roller and a second roller, which press both sides of a stack, in which electrodes and a separator are alternately stacked, a first elastic layer provided along an outer circumferential surface of the first roller and comprising an elastic material, and a first deformation prevention roller provided to be in contact with an outer circumferential surface of the first elastic layer so as to prevent the outer circumferential surface of the first elastic layer from being deformed.

17 Claims, 7 Drawing Sheets

<u>100</u>

(56)          References Cited

U.S. PATENT DOCUMENTS

| | | | |
|---|---|---|---|
| 2008/0261105 A1 | 10/2008 | Okawa et al. | |
| 2015/0034249 A1* | 2/2015 | Lee | H01M 4/13 |
| | | | 156/379.7 |
| 2018/0226630 A1* | 8/2018 | Yanai | B30B 3/00 |
| 2021/0050626 A1 | 2/2021 | Kim et al. | |

FOREIGN PATENT DOCUMENTS

| | | | |
|---|---|---|---|
| CN | 107225069 A | 10/2017 | |
| JP | 10-050300 A | 2/1998 | |
| JP | 10-228897 A | 8/1998 | |
| JP | 11-067235 A | 3/1999 | |
| JP | 11-176473 A | 7/1999 | |
| JP | 2001-283915 A | 10/2001 | |
| JP | 2001-356627 A | 12/2001 | |
| JP | 2005-196096 A | 7/2005 | |
| JP | 3793869 B2 | 7/2006 | |
| JP | 2008-218134 A | 9/2008 | |
| JP | 2009-181832 A | 8/2009 | |
| JP | 2015-145683 A | 8/2015 | |
| JP | 2018-018767 A | 2/2018 | |
| JP | 2018-206633 A | 12/2018 | |
| JP | 2019-163806 A | 9/2019 | |
| JP | 2019-209623 A | 12/2019 | |
| KR | 2002-0042685 A | 6/2002 | |
| KR | 10-2007-0093065 A | 9/2007 | |
| KR | 10-2014-0015647 A | 2/2014 | |
| KR | 10-2014-0119481 A | 10/2014 | |
| KR | 10-2018-0111711 A | 10/2018 | |
| KR | 10-2019-0055726 A | 5/2019 | |
| KR | 10-2019-0059210 A | 5/2019 | |
| KR | 10-2019-0091745 A | 8/2019 | |
| KR | 10-2019-0097666 A | 8/2019 | |

OTHER PUBLICATIONS

International Search Report (PCT/ISA/210) issued in PCT/KR2020/017823, dated Mar. 12, 2021.
Extended European Search Report for European Application No. 20898163.9, dated Jan. 9, 2024.

* cited by examiner

APPARATUS FOR MANUFACTURING ELECTRODE ASSEMBLY, ELECTRODE ASSEMBLY MANUFACTURED THERETHROUGH, AND SECONDARY BATTERY

CROSS-REFERENCE TO RELATED APPLICATION

The present application claims the benefit of the priority of Korean Patent Application No. 10-2019-0166055, filed on Dec. 12, 2019, which is hereby incorporated by reference in its entirety.

TECHNICAL FIELD

The present invention relates to an apparatus for manufacturing an electrode assembly, an electrode manufactured therethrough, and a secondary battery.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

The electrode assembly according to the related art is manufactured by pressing and combining electrodes and a separator while the electrodes and the separator pass between a pair of rollers. However, there has been a problem in that a stepped portion exists due to a difference in height between electrode and the separator sections, and an impact is applied to the stepped portion by a load of a roller, which is disposed at an upper side, resulting in a short defect due to destruction of the electrode. Also, there has been a problem in that sealing of a side surface of an electrode tab is impossible due to characteristics of the roller made of a metal material.

[Prior Art Document] (Patent Document) Korean Patent Publication No. 10-2014-0015647

DISCLOSURE OF THE INVENTION

Technical Problem

One aspect of the present invention is to provide an apparatus for manufacturing an electrode assembly, which is capable of preventing electrodes and a separator from being damaged when a stack of the electrodes and the separator are pressed to be combined with each other during manufacturing of the electrode assembly, an electrode assembly manufactured therethrough, and a secondary battery.

Another aspect of the present invention is to provide an apparatus for manufacturing an electrode assembly, which is capable of uniformly pressing a stack of electrodes and a separator, an electrode assembly manufactured therethrough, and a secondary battery.

Technical Solution

An apparatus for manufacturing an electrode assembly according to an embodiment of the present invention comprises a first roller and a second roller, which press both sides of a stack, in which electrodes and a separator are alternately stacked, a first elastic layer and a second elastic layer, provided along an outer circumferential surface of the first roller and comprising an elastic material, and a first deformation prevention roller provided to be in contact with an outer circumferential surface of the first elastic layer to prevent the outer circumferential surface of the first elastic layer from being deformed.

An electrode assembly according to an embodiment of the present invention may be an electrode assembly manufactured through the apparatus for manufacturing the electrode assembly.

A secondary battery according to an embodiment of the present invention may be a secondary battery comprising the electrode assembly manufactured through the apparatus for manufacturing the electrode assembly.

Advantageous Effects

According to the present invention, in the manufacturing of the secondary battery, when both the sides of the stack of the electrodes and the separator are pressed to be combined with each other through the first roller and the second roller, the first elastic part made of the elastic material may be provided on the outer circumferential surface of the first roller to prevent the electrodes and the separator from being impacted and damaged.

In addition, according to the present invention, when the first elastic part presses the end of the stack through the first roller, if the first elastic part is formed in the deformed shape such as the stepped portion corresponding to the end of the stack, the first deformation prevention roller may press the outer circumferential surface of the first elastic part to spread the portion at which the stepped portion occurs so as to form the even pressing surface on the outer circumferential surface of the first elastic part, thereby improving the sealing quality.

MODE FOR CARRYING OUT THE INVENTION

Figure 1:
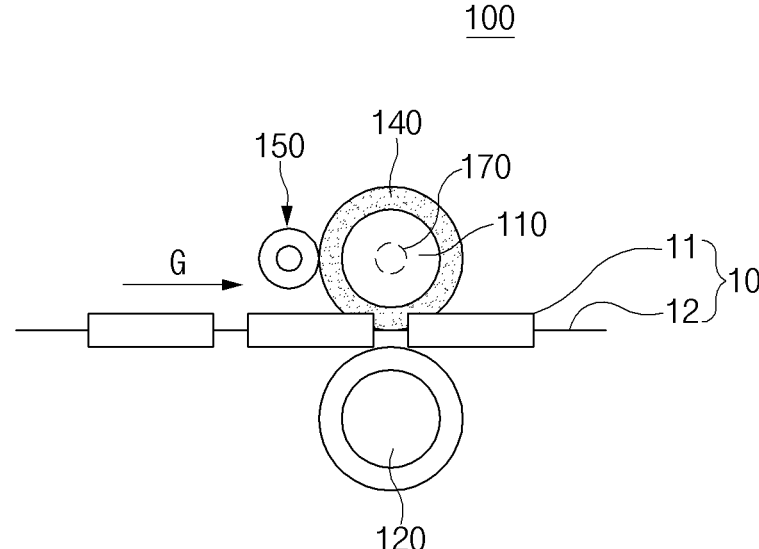
FIG. 1 is a front view illustrating an apparatus for manufacturing an electrode assembly according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

One Embodiment

Figure 2:
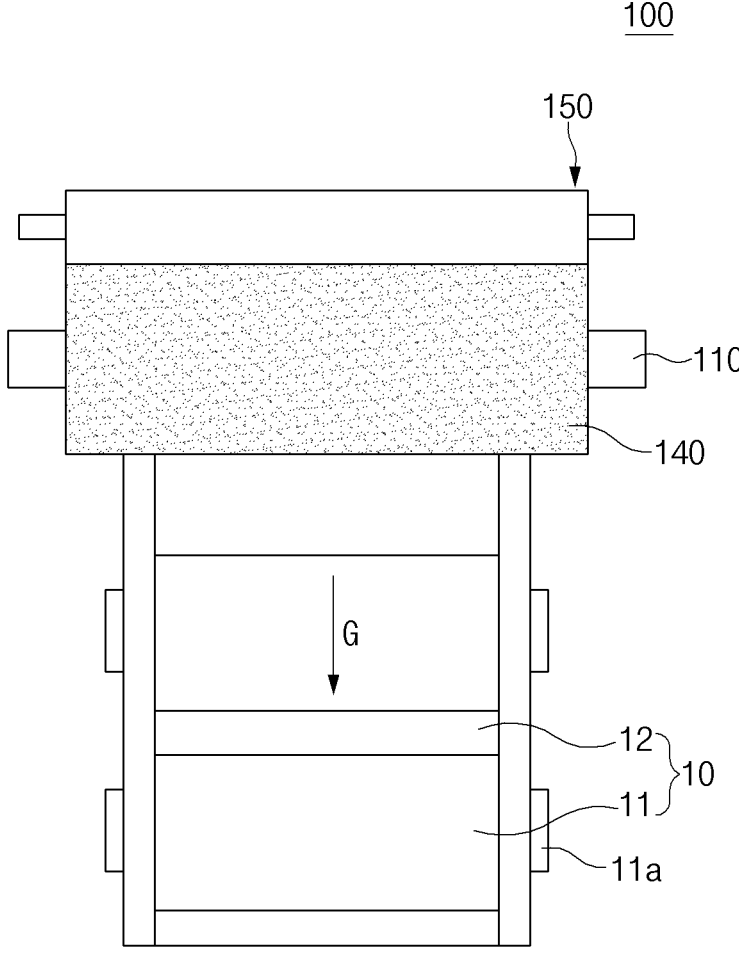
FIG. 2 is a plan view illustrating the apparatus for manufacturing the electrode assembly according to an embodiment of the present invention.

FIG. 1 is a front view illustrating an apparatus for manufacturing an electrode assembly according to an embodiment of the present invention, and FIG. 2 is a plan view illustrating the apparatus for manufacturing the electrode assembly according to an embodiment of the present invention.

Referring to FIGS. 1 and 2, an apparatus 100 for manufacturing an electrode assembly according to an embodiment of the present invention comprises a first roller 110 and a second roller 120 that press a stack 10 of electrodes 11 and a separator 12, which are alternately stacked, to combine the electrodes 11 and the separator 12 with each other, a first elastic part 140 provided along an outer circumferential surface of the first roller 110, and a first deformation prevention roller 150 that prevents the outer circumferential surface of the first elastic part 140 from being deformed.

Also, the apparatus 100 for manufacturing the electrode assembly according to an embodiment of the present invention may further comprise a first heater that heats the first roller 110.

In more detail, the apparatus 100 for manufacturing the electrode assembly according to an embodiment of the present invention is an apparatus for manufacturing an electrode assembly by pressing the stack 10 of the electrodes and the separator 12 and combining the electrodes and the separator 12 with each other.

Here, the electrode assembly may be a power generation element that is chargeable and dischargeable and be accommodated in a battery case to manufacture a secondary battery.

The electrode 11 may comprise a positive electrode and a negative electrode. Also, each of the separator separates a positive electrode and a negative electrode from each other to electrically insulate the positive electrode and the negative electrode from each other.

The positive electrode may comprise a positive electrode collector and a positive electrode active material applied to the positive electrode collector. For example, the positive electrode collector may be provided as foil made of an aluminum material, and the positive electrode active material may be made of lithium manganese oxide, lithium cobalt oxide, lithium nickel oxide, lithium iron phosphate, or a compound or mixture thereof containing at least one or more of the above-described materials.

The negative electrode may comprise a negative electrode collector and a negative electrode active material applied to the negative electrode collector. For example, the negative electrode collector may be provided as foil made of a copper (Cu) or nickel (Ni) material. The negative electrode active material may comprise synthetic graphite, lithium a metal, a lithium alloy, carbon, petroleum coke, activated carbon, graphite, a silicon compound, a tin compound, a titanium compound, or an alloy thereof. Here, the negative electrode active material may further comprise, for example, non-graphite-based SiO (silica) or SiC (silicon carbide).

The separator may be made of an insulation material, and the positive electrode, the separator, and the negative electrode may be alternately stacked. The separator 12 may be, for example, a multi-layered film produced by microporous polyethylene, polypropylene, or a combination thereof or a polymer film for solid polymer electrolytes or gel-type polymer electrolytes such as polyvinylidene fluoride, polyethylene oxide, polyacrylonitrile, or polyvinylidene fluoride hexafluoropropylene copolymers.

The first roller 110 and the second roller 120 may press both sides of the stack 10 of the electrodes 11 and the separator 12, which are alternately stacked, to combine the electrodes 11 and the separator 12 with each other.

Also, each of the first roller 110 and the second roller 120 may be made of steel. Also, the first roller 110 and the second roller 120 may be formed in, for example, a cylindrical shape to rotate about a central axis thereof. Here, the central axes of the first roller 110 and the second roller 120 may be parallel to each other. At this time, the first roller 110 and the second roller 120 may rotate to continuously press the stack 10 that proceeds in a traveling direction G.

Also, the first roller 110 may be disposed above the stack 10, and the second roller 120 may be disposed below the stack 10 to press top and bottom surfaces of the stack 10.

The first elastic part 140 may be provided along the outer circumferential surface of the first roller 110 and may comprise an elastic material. Thus, when pressing the stack 10 through the first roller 110, the first elastic part 140 made of the elastic material may be provided on the outer circumferential surface of the first roller 110 to prevent the stack 10 from being impacted and damaged. Particularly, a phenomenon in which an impact is applied to the electrodes 11 and the separator 12 at the stepped portion of the stack 10 to destroy the electrodes 11 or the separator, resulting in a short detect may be prevented from occurring. In addition, according to the related art, when a roller made of a metal material is used, a side portion of an electrode tab 11a, on which the stepped portion is formed, may not be pressed. However, according to the present invention, the side portion of the electrode tab 11a may be pressed by the first elastic part 140 made of the elastic material to improve sealing quality.

Also, the first elastic part 140 may be formed in a cylindrical shape.

Furthermore, the first elastic part 140 may be made of, for example, a rubber material.

The first deformation prevention roller 150 may be provided to be in contact with the outer circumferential surface of the first elastic part 140 so as to prevent the outer circumferential surface of the first elastic part 140 from being deformed.

Here, the first deformation prevention roller 150 may press the outer circumferential surface of the first elastic part 140 so that the stepped portion is not formed on the outer circumferential surface of the first elastic part 140.

As a result, when the first elastic part 140 presses the end of the stack 10 through the first roller 110, if a deformed shape such as the stepped portion corresponding to the end of the stack 10 is formed at the first elastic part 140 made of the elastic material, the first deformation prevention roller 150 may press the outer circumferential surface of the first elastic part 140 to spread a portion at which the stepped portion occurs to form a pressing surface on which the outer circumferential surface of the elastic part 140 is more uniform. Thus, when the stack 10 is pressed through the first elastic part 140 on which the even pressing surface is formed to seal the electrodes 11 and the separator 12 and combine the electrodes 11 and the separator 12 with each other, the sealing quality may be improved.

The first deformation prevention roller 150 may be made of, for example, a steel material.

Figure 3:
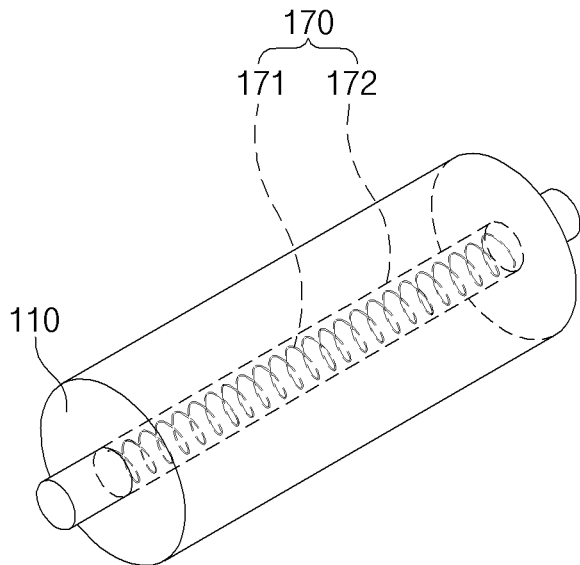
FIG. 3 is a perspective see-through view illustrating an example of a first heater which is mounted on a first roller of an apparatus for manufacturing an electrode assembly according to another embodiment of the present invention.

FIG. 3 is a perspective see-through view illustrating an example of a first heater which is mounted on a first roller of an apparatus for manufacturing an electrode assembly according to another embodiment of the present invention. A first heater 170 may be provided on a first roller 110 to heat the first roller 110, thereby heating a stack 10 through the heated first roller 110.

Here, the first heater 170 may comprise, for example, a heating wire 171 provided inside the first roller 110. At this time, when electricity flows through the heating wire 171, the first roller 110 may be heated by resistance heat. Also, the first heater 170 may further comprise a heater rod 172 in which the heating wire 171 is accommodated therein. Here, the heating wire 171 may be wound in the heater rod 172 and mounted inside the first roller 110.

Another Embodiment

Hereinafter, an apparatus for manufacturing an electrode assembly according to another embodiment of the present invention will be described.

Figure 4:
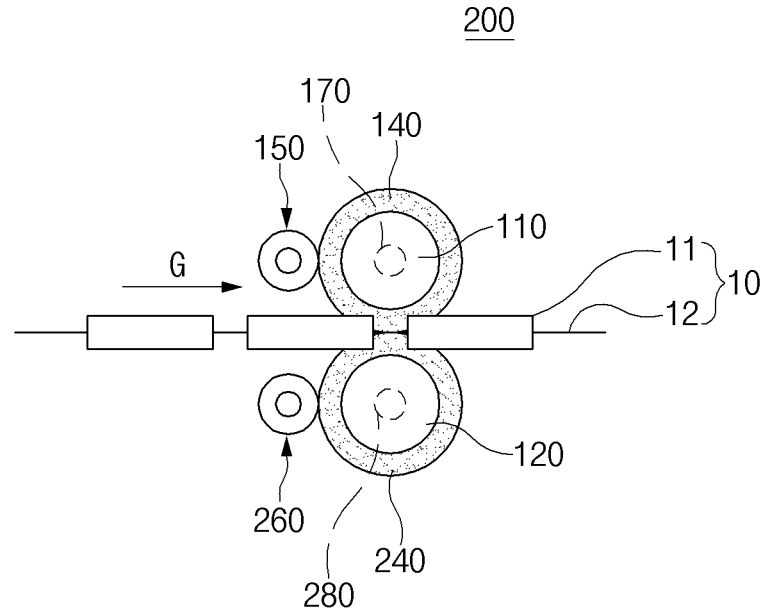
FIG. 4 is a front view illustrating the apparatus for manufacturing the electrode assembly according to another embodiment of the present invention.
Figure 5:
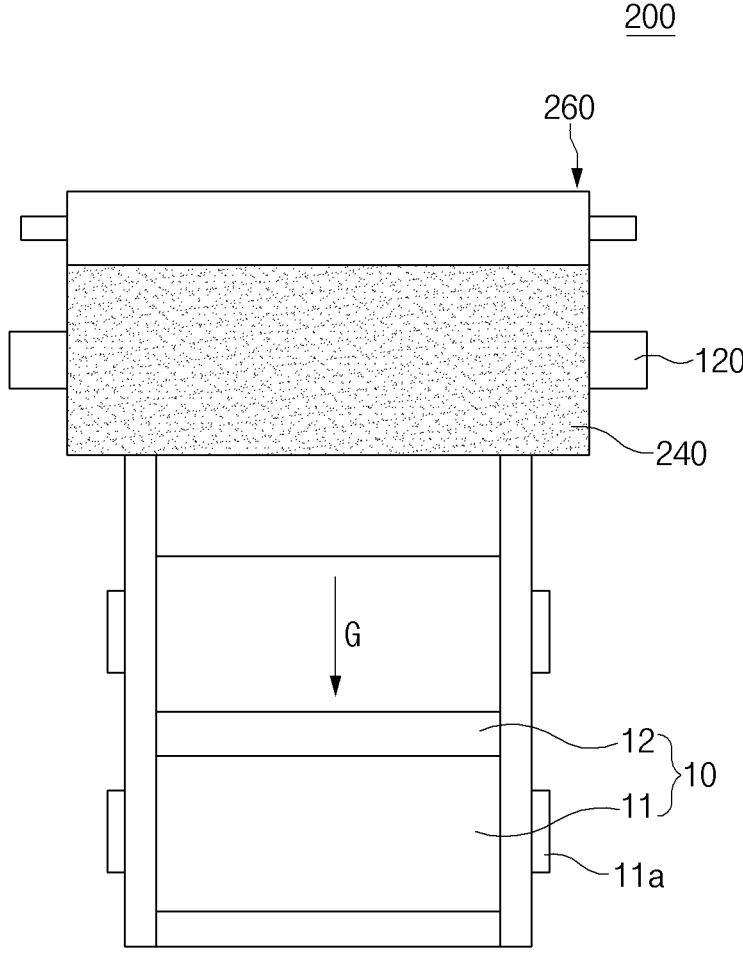
FIG. 5 is a bottom view illustrating the apparatus for manufacturing the electrode assembly according to another embodiment of the present invention.

FIG. 4 is a front view illustrating the apparatus for manufacturing the electrode assembly according to another embodiment of the present invention, and FIG. 5 is a bottom view illustrating the apparatus for manufacturing the electrode assembly according to another embodiment of the present invention.

Referring to FIGS. 3 and 4, an apparatus 200 for manufacturing an electrode assembly according to another embodiment of the present invention comprises a first roller 110 and a second roller 120 that press a stack 10 of electrodes 11 and a separator 12, which are alternately stacked, to combine the electrodes 11 and the separator 12 with each other, a first elastic part 140 provided along an outer circumferential surface of the first roller 110, a first deformation prevention part 150 that prevents the outer circumferential surface of the first elastic part 140 from being deformed, a second elastic part 240 provided along an outer circumferential surface of the second roller 120, and a second deformation prevention roller 260 that prevents the outer circumferential surface of the second elastic part 240 from being deformed. Also, the apparatus 200 for manufacturing the electrode assembly according to another embodiment of the present invention may further comprise a first heater that heats the first roller 110 and a second heater that heats the second roller 120.

The apparatus 200 for manufacturing the electrode assembly according to another embodiment of the present invention is different from the apparatus for manufacturing the electrode assembly according to the foregoing embodiment of the present invention in that the second elastic part 240 and the second deformation prevention roller 260 are further provided. Thus, in the apparatus 200 for manufacturing the electrode assembly according to another embodiment of the present invention, contents duplicated with those of the apparatus for manufacturing the electrode assembly according to the foregoing embodiment and the apparatus for manufacturing the electrode assembly according to another embodiment will be omitted or briefly described, and also, only differences therebetween will be described.

In more detail, the first roller 110 and the second roller 120 may press both sides of the stack 10 of the electrodes 11 and the separator 12, which are alternately stacked, to combine the electrodes 11 and the separator 12 with each other. Also, each of the first roller 110 and the second roller 120 may be made of steel. Also, the first roller 110 may be disposed above the stack 10, and the second roller 120 may be disposed below the stack 10 to press top and bottom surfaces of the stack 10.

The first elastic part 140 may be provided along the outer circumferential surface of the first roller 110 and may comprise an elastic material. Here, the first elastic part 140 may be formed in a cylindrical shape. At this time, the first elastic part 140 may be made of, for example, a rubber material.

The second elastic part 240 may be provided along the outer circumferential surface of the second roller 120 and may comprise an elastic material. Here, the second elastic part 240 may be formed in a cylindrical shape. At this time, the second elastic part 240 may be made of, for example, a rubber material.

Therefore, when pressing the stack 10 through the first roller 110 and the second roller 120, the first elastic part 140 and the second elastic part 240 are respectively provided on the outer circumferential surfaces of the first roller 110 and the second roller 120 to effectively prevent upper and lower portion of the stack 10 from being impacted and damaged.

The first deformation prevention roller 150 may be provided to be in contact with the outer circumferential surface of the first elastic part 140 so as to prevent the outer circumferential surface of the first elastic part 140 from being deformed. Also, the first deformation prevention roller 150 may press the outer circumferential surface of the first elastic part 140 so that the stepped portion is not formed on the outer circumferential surface of the first elastic part 140. Here, the first deformation prevention roller 150 may be made of, for example, a steel material.

The second deformation prevention roller 260 may be provided to be in contact with the outer circumferential surface of the second elastic part 240 so as to prevent the outer circumferential surface of the second elastic part 240 from being deformed. Also, the second deformation prevention roller 260 may press the outer circumferential surface of the second elastic part 240 so that the stepped portion is not formed on the outer circumferential surface of the second elastic part 240. Here, the second deformation prevention roller 260 may be made of, for example, a steel material.

Therefore, when the first elastic part 140 presses the end of the stack 10 through the first roller 110 and the second roller 120, if a deformed shape such as the stepped portion corresponding to the end of the stack 10 is formed at the first elastic part 140 and the second elastic part 240, each of which is made of the elastic material, the first deformation prevention roller 150 and the second deformation prevention roller 260 may press the outer circumferential surface of the first elastic part 140 and the second elastic part 240 to spread a portion at which the stepped portion occurs to form a pressing surface on which each of the outer circumferential surfaces of the elastic part 140 and the second elastic part 240 is more uniform. As a result, the upper and lower portions of the stack 10 may be pressed to the first elastic part 140 and the second elastic part 240, on which the even pressing surfaces are formed, respectively, through the first roller 110 and the second roller 120 to seal the electrodes 11 and the separator 12 so as to combine the electrodes 11 and the separator 12 with each other, thereby significantly improving the sealing quality.

Figure 6:
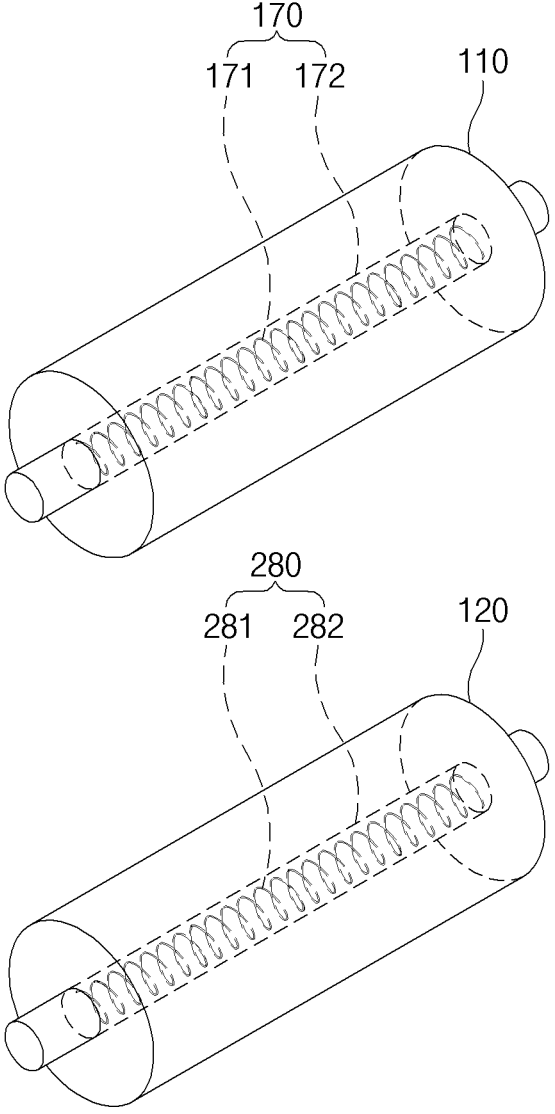
FIG. 6 is a perspective see-through view illustrating an example of first and second heaters which are respectively mounted on first and second rollers of the apparatus for manufacturing the electrode assembly according to another embodiment of the present invention.
Figure 7:
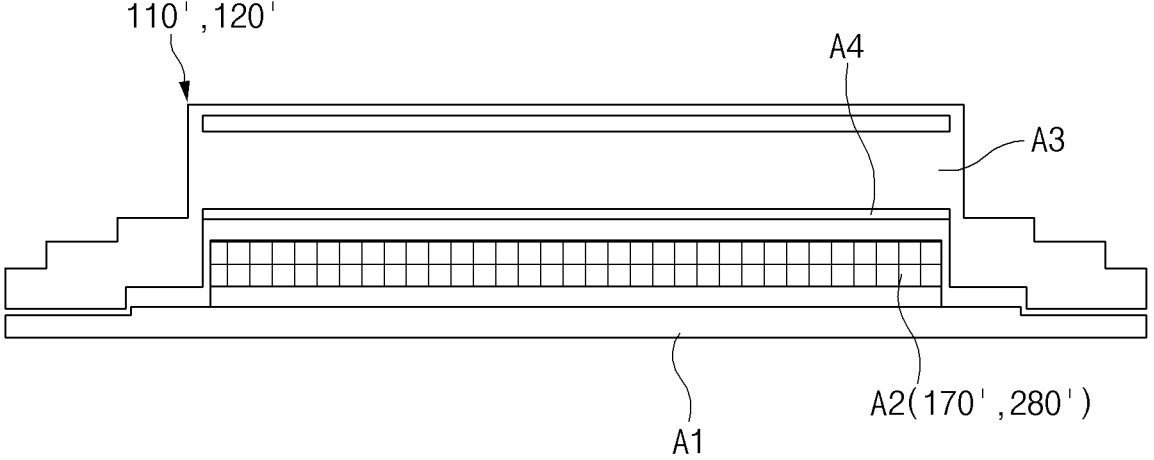
FIG. 7 is a cross-sectional view illustrating another example of a main part of the first and second heaters, which are respectively mounted on rollers of the apparatus for manufacturing the electrode assembly according to another embodiment of the present invention.

FIG. 6 is a perspective see-through view illustrating an example of first and second heaters which are respectively mounted on first and second rollers of the apparatus for manufacturing the electrode assembly according to another embodiment of the present invention, and FIG. 7 is a cross-sectional view illustrating another example of a main part of the first and second heaters, which are respectively mounted on rollers of the apparatus for manufacturing the electrode assembly according to another embodiment of the present invention.

Referring to FIGS. 4 and 6, a first heater 170 may be provided on the first roller 110 to heat the first roller 110. Thus, heat may be applied to the stack 10 through the heated first roller 110.

A second heater 280 may be provided on the second roller 120 to heat the second roller 120. Thus, heat may be applied to the stack 10 through the heated second roller 120.

Here, the first heater 170 and the second heater 280 may comprise, for example, heating wires 171 and 181 provided inside the first roller 110 and the second roller 120, respectively. At this time, when electricity flows through the heating wires 171 and 181, the first roller 110 and the second roller 120 may be heated by resistance heat. Also, the first heater 170 and the second heater 280 may further comprise heater rods 172 and 282 in which the heating wires 171 and 281 are accommodated therein, respectively. Here, the heating wires 171 and 281 may be wound in the heater rods 172 and 282 and mounted inside the first roller 110 and the second roller 120, respectively.

Referring to FIGS. 4 and 7, each of a first heater 170' and a second heater 280' may be provided as an induction heating heater as another example. At this time, each of the first roll 110' and the second roller 120' may comprise a shaft A1 provided at a center part thereof, an induction coil A2 wound around an outer circumferential surface of the shaft A1, and an outer cylinder A3 provided on an outer circumferential surface thereof. Here, when power is supplied to the induction coil A3, a magnetic flux crossing the outer cylinder A3 of the first roller 110' and the second roller 120' is generated, and the magnetic flux generates an eddy current in the outer cylinder A3 to generate a current flow such as an equivalent circuit, thereby heating the outer cylinder A3. At this time, heating of an initial heating portion A4 in the outer cylinder A3 starts to heat the entire outer cylinder A3. Therefore, the first roller 110' and the second roller 120' are heated in the induction heating manner, and thus, the inside and outside of the whole rollers may be heated simultaneously to maintain a temperature deviation within a temperature of 1° C. Also, a heating time (about 15 minutes) is fast, and there is no over-heating when stopped.

While the present invention has been particularly shown and described with reference to exemplary embodiments thereof, it is to be understood that the scope of the present invention is not limited to the apparatus for manufacturing the electrode assembly according to the present invention. It will be understood by those of ordinary skill in the art that various changes in form and details may be made therein without departing from the spirit and scope of the present invention.

Furthermore, the scope of protection of the present invention will be clarified by the appended claims.

DESCRIPTION OF THE SYMBOLS

10: Stack
11: Electrode
11a: Electrode tab
12: Separator
100, 200: Apparatus for manufacturing electrode assembly
110: First roller
120: Second roller
140: First elastic part
150: First deformation prevention roller
260: Second deformation prevention roller
240: Second elastic part
G: Traveling direction

The invention claimed is:

1. An apparatus for manufacturing an electrode assembly, the apparatus comprising:
a first roller and a second roller, which press both sides of a stack, in which electrodes and a separator are alternately stacked;
a first elastic layer provided along an outer circumferential surface of the first roller and comprising an elastic material; and
a first deformation prevention roller provided to be in contact with an outer circumferential surface of the first elastic layer to prevent the outer circumferential surface of the first elastic layer from being deformed, and the first deformation prevention roller positioned so that the stack passes between the first roller and the second roller and does not pass between the first roller and the first deformation prevention roller,
wherein central axes of the first roller and the second roller are aligned with each other along a first line, and a central axis of the first deformation prevention roller is not aligned on the first line, and
wherein the first deformation prevention roller presses the outer circumferential surface of the first elastic layer so that a stepped portion is not formed on the outer circumferential surface of the first elastic layer.

2. The apparatus of claim 1, wherein the first elastic layer is formed in a cylindrical shape.

3. The apparatus of claim 2, wherein the first roller is disposed above the stack, and the second roller is disposed below the stack to respectively press top and bottom surfaces of the stack.

4. The apparatus of claim 1, wherein the first elastic layer is made of a rubber material.

5. The apparatus of claim 1, wherein the second roller is made of a steel material.

6. The apparatus of claim 1, wherein the first deformation prevention roller is made of a steel material.

7. The apparatus of claim 1, further comprising a first heater provided in the first roller to heat the first roller.

8. The apparatus of claim 1, further comprising a second elastic layer provided along an outer circumferential surface of the second roller and comprising an elastic material.

9. The apparatus of claim 8, further comprising a second deformation prevention roller disposed to be in contact with the outer circumferential surface of the second elastic layer so as to prevent a stepped portion from being formed on the outer circumferential surface of the second elastic layer.

10. The apparatus of claim 8, wherein the second roller has a central part made of metal, and wherein second elastic layer contacts the outer surface of the central part.

11. An electrode assembly manufactured through the apparatus for manufacturing the electrode assembly of claim 1.

12. A secondary battery comprising the electrode assembly of claim 11.

13. The apparatus of claim 1, wherein the first roller has a central part made of metal, and wherein first elastic layer contacts an outer surface of the central part.

14. The apparatus of claim 1, wherein the first deformation prevention roller presses on the outer circumferential surface of the first elastic layer to adjust a deformed shape of the outer circumferential surface to be uniform.

15. The apparatus of claim 1, wherein the central axis of the first roller and the central axis of the first deformation prevention roller are aligned on a second line that is parallel to a traveling direction of the electrode assembly.

16. The apparatus of claim 1, wherein a diameter of the first roller is greater than a diameter of the first deformation prevention roller.

17. The apparatus of claim 1, wherein a distance between the stack and the central axis of the first roller is about the same as a distance between the stack and the central axis of the first deformation prevention roller.

\* \* \* \* \*